H. HESS.
BALL BEARING.
APPLICATION FILED FEB. 15, 1907.
1,079,340.
Patented Nov. 25, 1913.
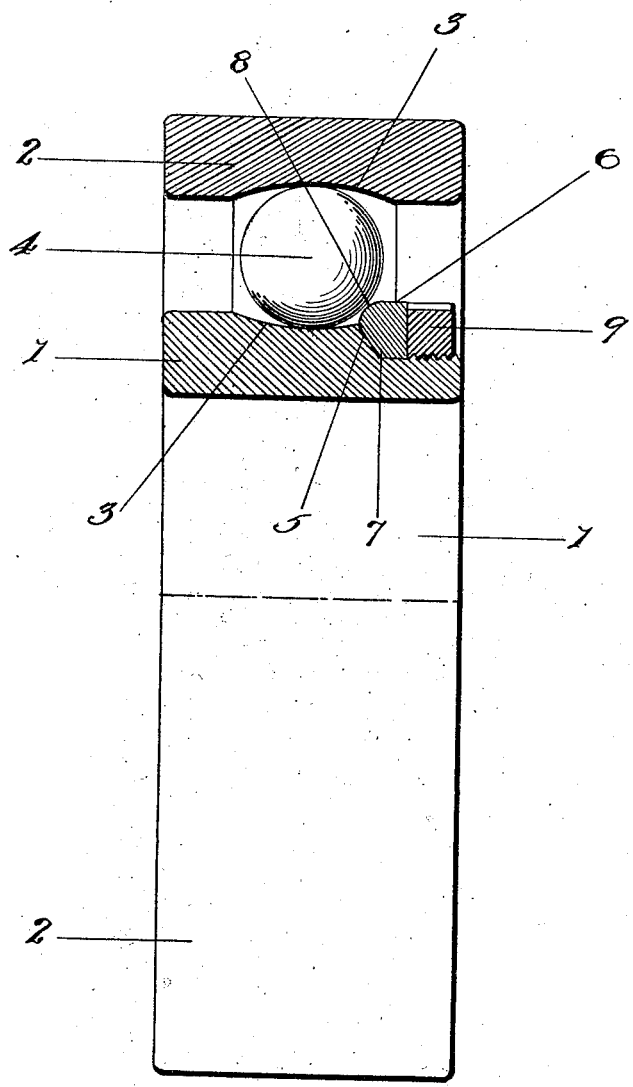
Witnesses
Nancey E. Costello.
Chas. K. Davies
Inventor
Henry Hess
By Brock & Smith

UNITED STATES PATENT OFFICE.

HENRY HESS, OF PHILADELPHIA, PENNSYLVANIA, ASSIGNOR TO THE HESS-BRIGHT MANUFACTURING COMPANY, OF PHILADELPHIA, PENNSYLVANIA, A CORPORATION OF DELAWARE.

BALL-BEARING.

1,079,340.  Specification of Letters Patent.  Patented Nov. 25, 1913.

Application filed February 15, 1907. Serial No. 357,442.

*To all whom it may concern:*

Be it known that I, HENRY HESS, a citizen of the United States, residing at Philadelphia, in the county of Philadelphia and State of Pennsylvania, have invented a new and useful Ball-Bearing, of which the following is a specification.

My invention relates to ball bearings and has for an especial object the provision of improved means for assembling a ball bearing of unit construction and for retaining the bearing in assembly.

More particularly the invention consists in cutting away one edge of one of the race rings of such a bearing sufficiently so that the balls may be inserted in the races by suitable means, such as by the application of pressure, varying the relative sizes of the race rings, etc., preferably without the provision of any filling opening; a retaining ring applied to one of the bearing rings for preventing accidental displacement of the balls, this ring being shaped so as to prevent the balls from contacting with the intersection of the ring and race; and means applied to the bearing rings for holding the retaining ring in place thereon. This construction results in an entirely self-contained bearing which may be handled, shipped and placed in working position as a unit.

The characteristics and advantages of my invention are hereinafter more fully described in connection with the accompanying drawing which shows an exemplifying structure embodying the invention.

The figure is a partial longitudinal section of a ball bearing to which the invention is applied.

Reference numeral 1 designates the inner bearing ring; 2, the outer bearing ring; 3, races therein; and 4, balls running in the races. The edge of the inner bearing ring adjacent to the ball race is cut away so that the diameter at the point 5 is but slightly greater than the ball contact line of the race.

The bearing is assembled by placing the balls in position in the outer race, placing the cut-away portion of the inner ring against the balls, and applying pressure sufficient to force part 5 of the ring past the balls, which then lie in their proper position in the two races. The process may be facilitated by increasing the size of the outer ring in relation to the inner ring by any suitable means.

6 is a retaining ring seated on a shoulder 7 in the inner ring, conveniently conical although this is not essential.

8 is a convex surface of the retaining ring which, if the balls tend to move toward the ring, encounters the balls and prevents them from coming in contact with the line of intersection between the retaining ring and the race surface and so prevents possibility of damage to the balls or crumbling of the race, which is liable to occur if the balls come in contact with this line of intersection.

9 is a nut having internal threads engaging an external screw thread formed on the bearing ring, serving to lock the retaining ring in position; this nut is only representative of means for holding the retaining ring in position, and instead of the nut a plain ring shrunk or sprung in position on the bearing ring may be employed, or the retaining ring 6 itself may in some cases be screwed or otherwise secured on the bearing ring without any other additional locking device.

It will be obvious to those versed in the art that instead of the inner ring, the outer ring may be shaped so as to permit the method of assembly described and that the retaining ring may be applied to the outer ring instead of to the inner ring in an obvious manner.

Having described my invention, what I claim is:

The combination of two bearing rings provided with races, balls in the races, one of the rings being cut-away at one side to approximately the depth of its race, the ring also being formed with a shoulder adjacent to the race, a retaining ring on said bearing ring having a convexly curved face presented to the balls and a nut engaging a screw thread on the bearing ring and serving to hold the retaining ring in position.

In testimony whereof, I have hereunto affixed my signature in the presence of two witnesses.

HENRY HESS.

Witnesses:
 THEO. H. M'CALLA,
 H. M'CALLA.